Figure 12:
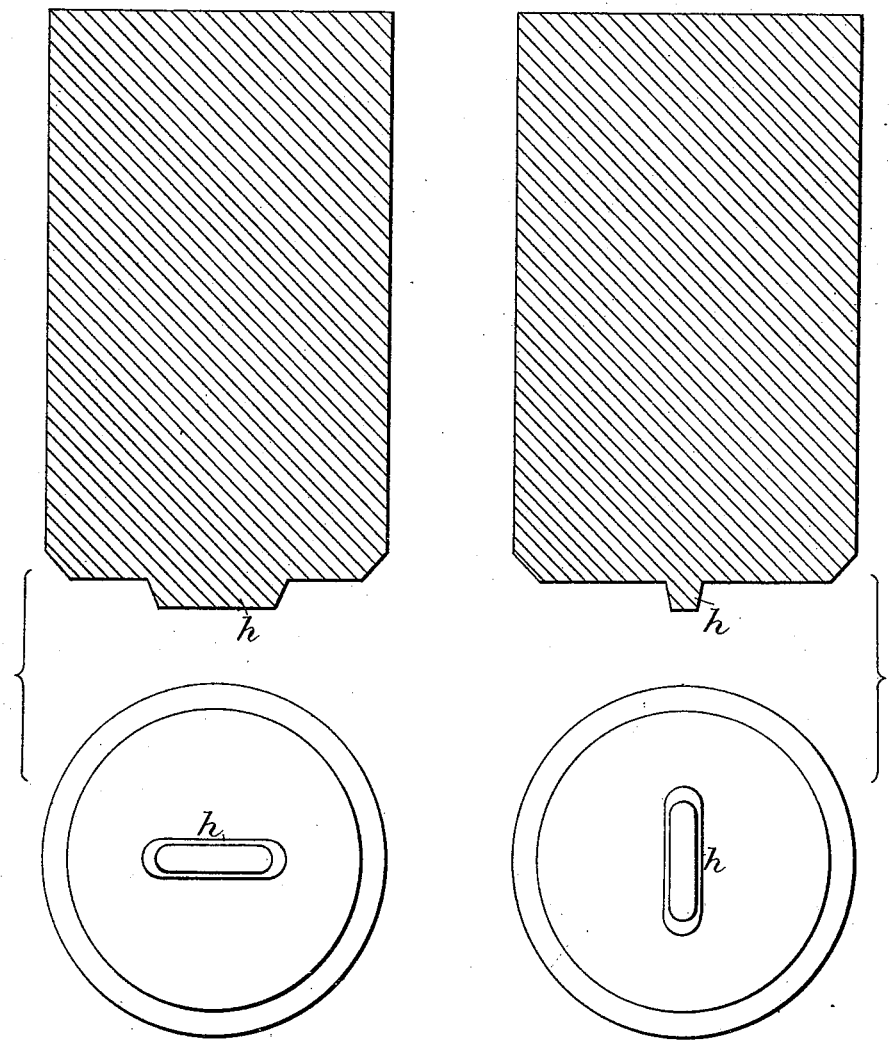

(No Model.) 5 Sheets—Sheet 1.
H. NETTLEFOLD & J. SHELDON.
MANUFACTURE OF SCREW BLANKS.
No. 438,938. Patented Oct. 21, 1890.
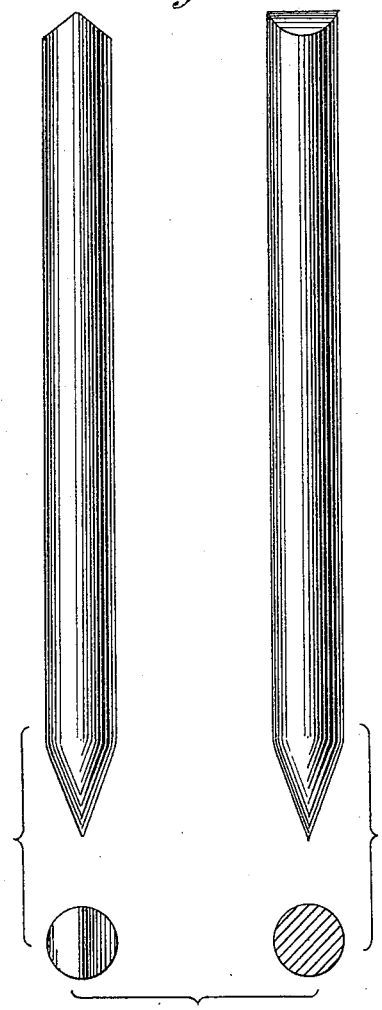
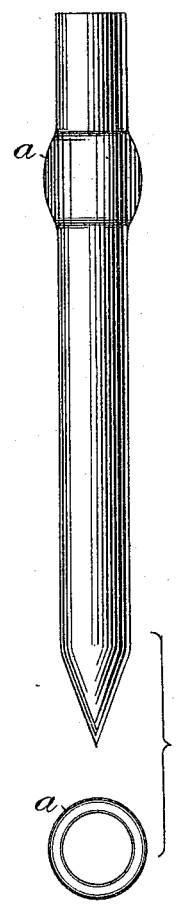
Witnesses:—
George Shaw
Richard Skerrett
Inventors:—
Hugh Nettlefold
John Sheldon (No Model.) 5 Sheets—Sheet 2.
H. NETTLEFOLD & J. SHELDON.
MANUFACTURE OF SCREW BLANKS.
No. 438,938. Patented Oct. 21, 1890.
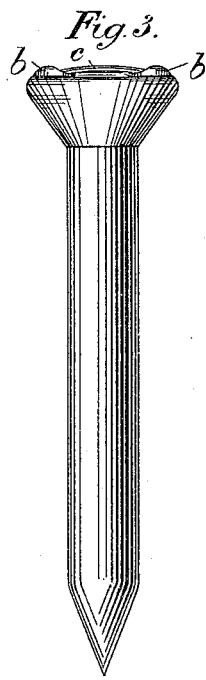
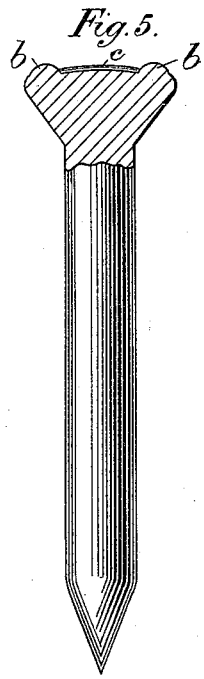
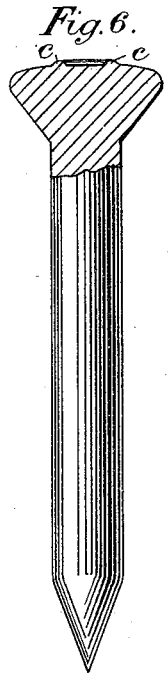
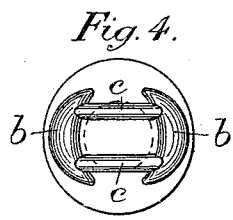
Witnesses:—
George Shaw
Richard Skerrett
Inventors:—
Hugh Nettlefold
John Sheldon (No Model.) 5 Sheets—Sheet 3.
H. NETTLEFOLD & J. SHELDON.
MANUFACTURE OF SCREW BLANKS.
No. 438,938. Patented Oct. 21, 1890.
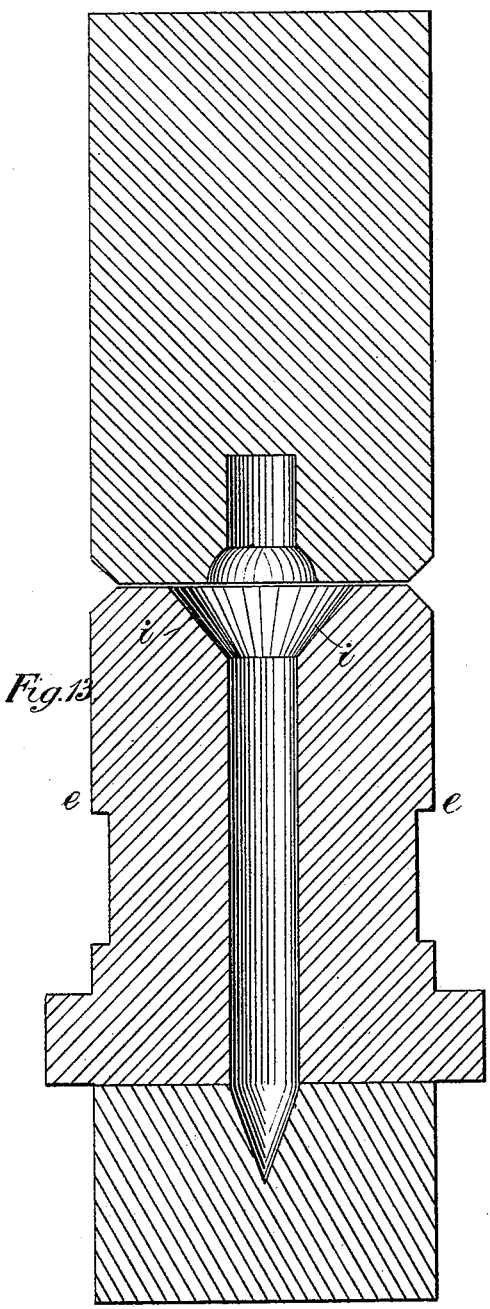
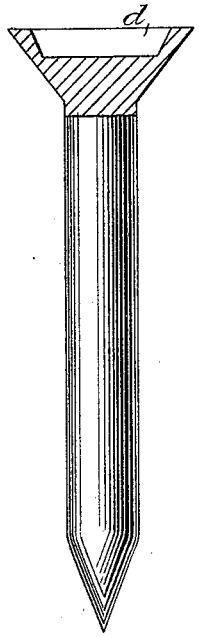
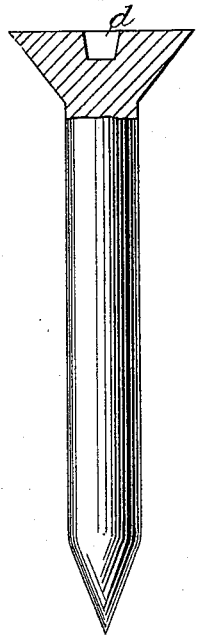
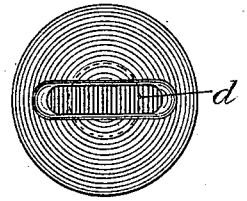
Witnesses:—
George Shaw
Richard Skerrett
Inventors:—
Hugh Nettlefold
John Sheldon

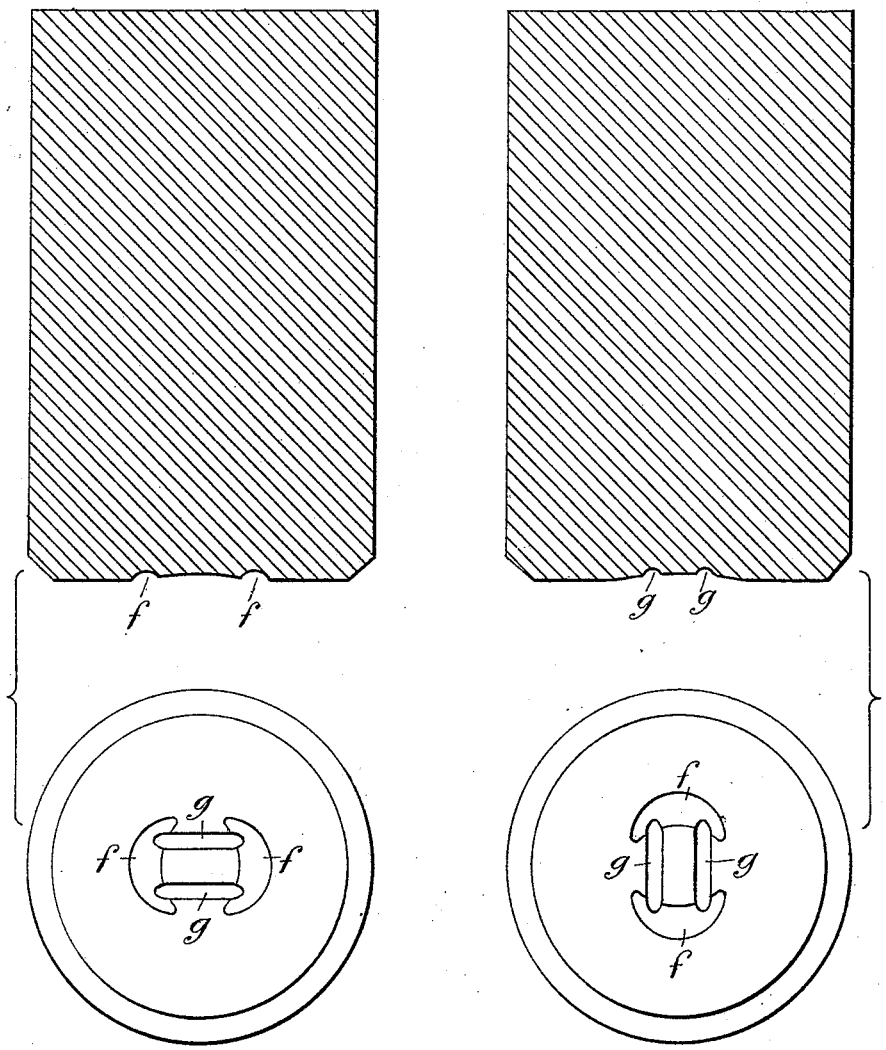

(No Model.) 5 Sheets—Sheet 5.

H. NETTLEFOLD & J. SHELDON.
MANUFACTURE OF SCREW BLANKS.

No. 438,938. Patented Oct. 21, 1890.

Witnesses:-
George Shaw
Richard Skerrett

Inventors:-
Hugh Nettlefold
John Sheldon

UNITED STATES PATENT OFFICE.

HUGH NETTLEFOLD AND JOHN SHELDON, OF BIRMINGHAM, ENGLAND, ASSIGNORS TO NETTLEFOLDS, LIMITED, OF SAME PLACE.

MANUFACTURE OF SCREW-BLANKS.

SPECIFICATION forming part of Letters Patent No. 438,938, dated October 21, 1890.

Application filed July 17, 1890. Serial No. 359,004. (No model.)

*To all whom it may concern:*

Be it known that we, HUGH NETTLEFOLD and JOHN SHELDON, both of Birmingham, England, subjects of the Queen of Great Britain, have invented certain new and useful Improvements in the Manufacture of Screw-Blanks; and we do hereby declare that the following is a full, clear, and exact description of the invention, which will enable others skilled in the art to which it appertains to make and use the same.

Our invention has reference to the manufacture of screw-blanks to be made into screws, in the heads of which grooves or depressions are made for the reception of a screw-driver in place of the ordinary nick, the said grooves extending diametrically nearly but not quite all across the head—that is, the said grooves are closed at their ends instead of opening in the under conical side of the head, as the ordinary nick does.

In making a closed groove in the flat face of the head of a screw-blank the impressing-tool or grooving-punch on entering the said flat face of the head tends, while being depressed into the head, to force the metal out on either side of it, thus distorting the circular figure of the said flat face and leaving a depression or deficiency of metal at the ends of the groove, and also leaving the sides of the groove rounded.

Our invention has for its object to produce the said closed groove without distorting the head, and without leaving a deficiency of metal at the ends and side edges of the groove, and this we effect in the following manner:

In upsetting the end of the wire of which the blank is made in order to make the head of the blank, we employ a movable or upper die or tool having two curved or crescent-shaped depressions made in its under or acting face, the said depressions being of somewhat shorter radius than the circular head of the blank to be made and symmetrically situated at opposite sides of the center of the tool. We also make slight parallel depressions at a distance apart somewhat greater than the breadth of the groove to be made, the said parallel depressions being in a direction crossing a plane midway between the crescent-shaped depressions. By the operation of this die or tool in conjunction with the lower or fixed die or tool a head is produced on the end of the wire, on the otherwise flat face of which head are two curved or crescent-shaped ribs or projections and also the two parallel projections referred to, the counterparts of the depressions in the movable tool hereinbefore described. The head thus produced is operated upon by the impressing-tool or grooving-punch in such a way that the groove made is in a line crossing the center of the face of the head and bisecting each of the curved or crescent-shaped ribs or projections. The distortion of the circular figure of the face of the head is thus prevented and deficiency of metal at the ends of the groove avoided, for while the metal spreads outward at each of the longer sides of the tool the crescent-shaped ribs or projections are crushed or flattened by the flat face of the tool and forced toward the ends of the closed groove in course of formation. The parallel ribs on either side of the groove are also flattened and the rounding of the edges of the groove prevented. There is thus formed a head, the top or flat face of which is circular but somewhat larger than the said face before the grooving-tool operated upon it, the said head having a closed groove crossing the center of its face.

Although we prefer to make the projections on the face of the head of a cresent shape, as described, we do not confine ourselves thereto, the essence of our invention consisting in making projections which when the grooving-tool enters the flat face of the head will be flattened and made to prevent any deficiency of metal at the ends or sides of the closed groove formed, the flat part of the head being at the same time preserved of a circular figure.

We will now proceed to describe, with reference to the accompanying drawings, the manner in which our invention is to be performed.

Figure 1 represents the cut-off and pointed piece of wire from which the screw-blank is to be made. Fig. 2 represents the piece of wire, Fig. 1, after a bulbous projection *a* has been formed on the end of the blank, from which end the head is to be made. Fig. 3 represents in elevation, and Fig. 4 in plan, the screw-blank after the first heading stage, by which a small head is made on its end and the face of the partly-made head provided with two crescent-shaped ribs or projections $b\,b$, having the curvature represented, and also two parallel ribs or projections $c\,c$ at a distance apart somewhat greater than the breadth of the closed groove to be made, the said parallel ribs or projections $c\,c$, having the positions with respect to the crescent-shaped ribs or projections $b\,b$ represented in the drawings. Figs. 5 and 6 represent sections taken at right angles to one another of the head part of the blank, Figs. 3 and 4. Figs. 7 and 8 represent elevations with the head part in section, taken in planes at right angles to one another; and Fig. 9 in plan a finished screw-blank made from the blank, Figs. 3, 4, 5, and 6, the head of the screw-blank, Figs. 7, 8, and 9, being provided with a closed groove $d$ in its flat face. Figs. 10, 11, and 12 represent the upper tools used for upsetting the wire and for impressing and grooving the head, the said upper tools being used in conjunction with the single lower tool represented in Fig. 13.

The upper tool, Fig. 10, is first used with the lower tool, Fig. 13, for upsetting the wire and forming the bulbous projection $a$ near the end of the wire, as represented in Fig. 2. The upper tool, Fig. 11, is used in conjunction with the lower tool, Fig. 13, for further upsetting the wire and forming the crescent-shaped ribs or projections $b\,b$ and the parallel ribs or projections $c\,c$ on the face of the head. The upper tool, Fig. 11, is represented in section and plan, the two sections being taken in planes at right angles to one another. The tool, Fig. 11, has in its under face the depressions $f\,f$ for forming the crescent-shaped ribs or projections $b\,b$ and the parallel depressions $g\,g$ for forming the parallel ribs or projections $c\,c$ on the face of the head. The upper tool, Fig. 12, is used in conjunction with the lower tool, Fig. 13, for impressing or forming the closed groove $d$ in the head of the blank, the punch part $h$ of the tool entering the face of the head. In Fig. 12 sectional views and plans of the head are shown, the two sectional views being taken in planes at right angles to one another.

The finished screw-blank and the same in its different stages, as well as the tools used, are drawn to a large scale for the purpose of the better illustrating our invention.

We will now describe in detail the manufacture of a screw-blank with a closed groove in its head according to our invention. We take the cut-off and pointed wire, Fig. 1, and place it in the lower tool $e$, Fig. 13, and by the operation of the cupped upsetting-tool, Fig. 10, we partly upset one end of the wire and form the bulbous projection $a$ on it, as represented in Fig. 2. This upsetting stage of the manufacture constitutes no part of our invention. The partly-upset wire of the kind represented in Fig. 2 in the die, Fig. 13, is next operated upon by the upsetting and impressing tool represented in Fig. 11, whereby a head of the kind represented in Figs. 3, 4, 5, and 6 is formed upon it, the said head partly filling the conical cavity $i$ in the lower tool $e$, Fig. 13, and the face of the head being impressed with the crescent-shaped ribs or projections $b\,b$, and parallel ribs or projections $c\,c$, the counterparts of the depressions $f\,f$ and $g\,g$ in the tool, Fig. 11. The partly-headed blank of the kind represented in Figs. 3, 4, 5, and 6 in the die, Fig. 13, is finally operated upon by the impressing-tool or grooving-punch, Fig. 12, the part $h$ of the said tool or punch, Fig. 12, operating upon the face of the head in a line midway between the parallel ribs or projections $c\,c$, and partly bisecting each of the crescent-shaped ribs or projections $b\,b$. By the use of the crescent-shaped ribs or projections $b\,b$ and parallel ribs or projections $c\,c$ the distortion of the circular figure of the head is prevented, and deficiency of metal at the ends and sides of the closed groove $d$ avoided, as during the last-described stage of the heading operation, while the metal spreads outward at each of the larger sides of the heading-tool, Fig. 12, the crescent-shaped ribs or projections $b\,b$ are crushed or flattened by the flat face of the tool and forced toward the ends of the closed groove in course of formation, the parallel ribs or projections $c\,c$ being at the same time flattened and the rounding of the edges of the closed groove prevented.

In place of the crescent-shaped ribs or projections $b\,b$, ribs or projections of other forms may be employed.

Having now particularly described and ascertained the nature of our invention and the manner in which the same is to be performed, we declare that we claim as our invention of improvements in the manufacture of screw-blanks having heads with closed grooves—

Forming on the face of the partly-made head of the blank during the heading operation ribs or projections near the parts where the ends of the closed groove are to be formed, and also parallel ribs or projections situated at opposite sides of the center of the head and in the same direction as the intended groove, the said ribs or projections when the grooving-tool enters the flat face of the head being flattened and made to prevent any deficiency of metal at the ends and side edges of the closed groove, and preserving the circular figure of the head, substantially as hereinbefore described, and illustrated in the accompanying drawings.

HUGH NETTLEFOLD. [L. S.]
JOHN SHELDON. [L. S.]

Witnesses:
GEORGE SHAW,
RICHARD SKERRETT.